United States Patent Office 3,207,729
Patented Sept. 21, 1965

3,207,729
ANIONIC POLYMERIZATION OF LACTAMS WITH 2,2,4,4-TETRAMETHYL - 1,3 - CYCLOBUTANE DIONE AS PROMOTER
John W. Giberson, Woodstown, N.J., assignor to E. I. du Pont de Nemours and Company, Wilmington, Del., a corporation of Delaware
No Drawing. Filed Oct. 8, 1962, Ser. No. 229,159
5 Claims. (Cl. 260—78)

This invention relates to a process, and more particularly to an improved process for the polymerization of lactams to polyamides.

The polymerization of caprolactam to give 6-nylon, a polyamide, has been known for many years. The earliest processes for this polymerization were slow, requiring several hours, and involved the use of water or acidic reagents as polymerization catalysts. Subsequent work showed that anhydrous caprolactam could be polymerized above 200° C. in the presence of strongly basic materials, particularly the alkali and alkaline earth metals, their hydrides, hydroxides, alkoxides, oxides, alkyls or amides. More recently, it has been disclosed that the base catalyzed polymerization of caprolactam and other lactams can be made especially fast by the addition of certain compounds which function as cocatalysts. Particularly effective cocatalysts which have been disclosed include acyl halides, anhydrides and the like; isocyanates, and compounds containing tertiary nitrogen having at least two of the three substituents on the nitrogen atom consisting of carbonyl, thiocarbonyl, sulfonyl, phosphenyl, thiophosphenyl and nitroso radicals.

The present invention provides an improved process for rapidly polymerizing lactams. More particularly, the process of this invention is an improvement in the process for polymerizing lactams in the presence of lactam-base salts, which improvement comprises carrying out said polymerization in the presence of a cocatalyst, 2,2,4,4-tetramethyl-1,3-cyclobutanedione.

The polymerization process of this invention is particularly effective in producing rapidly high molecular weight polyamides from lactams containing from 3 to 12 or more carbon atoms in the lactam ring. Such lactams include pyrrolidone, piperidone, ε and γ-caprolactam, enantholactam, caprylolactam, and laurolactam. Generally, the anionic polymerization process can be carried out at temperatures above the melting point of the lactam monomer but below the melting point of the resulting polyamide. In general, this temperature range is from about 25° C. to about 200° C., depending on the particular lactam employed. With lactams containing less than 6 carbon atoms in the lactam ring, the preferred temperature of polymerization is below 150° C. ε-Caprolactam is readily polymerized by the process of this invention at temperatures between 100 and 200° C. 150° C. being a convenient operating temperature.

The lactam-base salts used in the process of this invention are prepared by the reaction of bases with a lactam. Generally, the lactam to be polymerized is used for the preparation of the anionic catalyst; but if desired, the anionic catalyst can be prepared from another lactam.

The base employed to form the anionic catalyst can be an alkali metal, an alkaline earth metal, or a basic derivative of one of these metals such as hydroxide, alkoxide, hydride, alkyl, aryl, amide, or organic acid salt. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl, sodamide, sodium stearate and the like are suitable bases for the preparation of the anionic catalyst. This anionic catalyst, that is, lactam-base salt, is prepared by heating the lactam with a base of a temperature between about 25 to 225° C. and above the melting point of the lactam. The base can be added to the total lactam which is to be polymerized or to a portion of the lactam which is to be polymerized and this portion of the resultant lactam containing the anionic catalyst added to more of the lactam later. Little or no polymerization occurs during the preparation of the anionic catalyst carried out between the melting point of the lactam and about 225° C. The time required for this step in the process depends upon the strength of the base employed, the proportion added, and the temperature chosen and can be from a few seconds to several hours. Preferably, the lactam should be essentially anhydrous as should the added base. The concentration of the base usually is such as to provide a final concentration for the polymerization in the range of between 0.1 and about 10 mole percent based on the lactam. Proportions in the higher end of this range produce lower molecular weight polyamides, so optimum proportions for most purposes are from about 0.2 to 5 mole percent of the strong base. The cocatalyst, tetramethyl-1,3-cyclobutanedione, can be employed in proportions varying from about 0.05 to about 5 mole percent based on the lactam. The cocatalyst can be added to the lactam containing the anionic catalyst, or equally well the cocatalyst can be dissolved in a separate portion of the lactam and the two portions of lactam mixed at the time the polymerization is desired. For optimum operation of the process of this invention, an inert gas such as nitrogen is bubbled through the molten lactam during the initial reaction with the basic catalyst in order to remove any low molecular weight compound formed such as water and in order to prevent oxidation. Alternatively, the reaction of the lactam with the basic catalyst can be carried out under reduced pressure in which case the low molecular weight compound is distilled from the lactam.

The process of this invention is useful in rapidly preparing cast articles of any size and shape from lactams. The process can be employed to obtain unusual shapes which would be difficult, if not impossible, to obtain by conventional molding of prepolymerized polycarboxamides. The process has the advantage when used in this fashion that high temperatures and high pressures normally required in injection molding and similar processes are not necessary. Therefore, simpler lighter weight molds can be employed and faster cycles can often be obtained in the preparation of large shaped articles. The entire process can be carried out in the mold or, if desired, the lactam solution containing the anionic catalyst and a second portion of the lactam solution containing the cocatalyst can be mixed and then immediately cast into the mold by procedures similar to transfer molding to obtain the desired shaped article in any size at a very high rate. Similarly, it is possible to employ the process of this invention in many extrusion-type operations, in which the lactam containing the anionic catalyst and another portion of the lactam containing the cocatalyst are intimately mixed and then extruded under conditions which provide for obtaining an extrudate which is polymerized as it is formed.

The process of this invention is operable in the presence of various fillers and reinforcing agents. Thus, if desired, glass mats or mats of synthetic fibers can be impregnated with the solution and rapidly cured. Similarly, finely-divided fillers can be suspended in the polymerizing mixture to obtain filled polycarboxylamides. Obviously antioxidants, blowing agents, plasticizers, other resins e.g., styrene, acrylic, nylon polyester, colorants, and the like can also be employed. The process of this invention contemplates the use of the process under all of the above conditions.

The process of this invention can likewise be used in the presence of a gas-generating material to give foamed plastic articles. The gas-generating material can be a low boiling liquid or an unstable compound which releases gas when heated. The process of this invention likewise can be carried out as a coating process in which the lactam solution containing anionic catalyst and the cocatalyst is applied as a liquid to the surface of a web such as paper or a textile and then permitted to polymerize to the polycarboxamides and thus form a coating of polycarboxamide film on a substrate.

The invention is more thoroughly illustrated with the aid of the following examples. Parts and percentages where given are by weight.

*Examples 1 through 7*

In these examples, a mixture of 22.6 parts of ε-caprolactam and base (sodium hydride or sodium methoxide) is placed in a reaction vessel which is immersed in an oil bath at 150° C. and nitrogen is bubbled through the molten caprolactam at the rate of 350 cc./minute. After heating for 20 minutes the cocatalyst 2,2,4,4-tetramethyl-1,3-cyclobutanedione is added to the molten caprolactam at 150° C. The course of the polymerization is observed visually and the time from the addition of the cocatalyst to the time at which no perceptible flow of the melt occurs when the reaction vessel is held at a 40° angle is observed. This is recorded as "no flow time." The total time for the polymerization is manifested by shrinking of the polymer from the walls of the reaction vessel. Solutions of polymers made using the cocatalyst of the present invention in 90% formic acid contain gel particles indicating that crosslinking occurs during the polymerization. The polymers formed by this procedure are light in color and tough. The quantities of catalyst and cocatalyst are based on caprolactam used.

| Ex. No. | Sodium Methoxide Catalyst, mol. percent | Sodium Hydride Catalyst, mol. percent | Tetramethyl 1,3-cyclobutanedione cocatalyst, mol. percent | Temp. (° C.) | No Flow Time (min.) |
|---|---|---|---|---|---|
| 1 | 0.85 | | 0.20 | 150 | 7.5 |
| 2 | 1.0 | | 0.40 | 150 | 4.0 |
| 3 | 1.6 | | 0.40 | 150 | 3.0 |
| 4 | 0.85 | | 0.20 | 180 | 1.0 |
| 5 | 0.6 | | 0.6 | 150 | 6.0 |
| 6 | | 0.5 | 0.4 | 150 | 5.5 |
| 7 | | 2.5 | 0.4 | 150 | 1.5 |

*Example 8*

Caprolactam (9072 grams) is sparged by heating to 130° C. and passing 1000 ml. of nitrogen per pound of lactam through it over a period of 30 minutes.

2% sodium caprolactam is prepared by cooling an equal quantity of the sparged lactam to 100° C., adding 86.54 grams of sodium methoxide, sparging over a period of 45 minutes with 4000 ml. of nitrogen per pound of lactam, and degassing at 100° C. for 20 minutes at 24–25 inches of mercury pressure.

Forty milliliters of the sparged caprolactam in a 38 x 300 mm. Pyrex tube is melted, 2.4 g. of potassium stearate and 0.4 g. of 2,2,4,4-tetramethyl-1,3-cyclobutanedione is added and the temperature adjusted to 150° C. while bubbling nitrogen through the mixture. Sodium caprolactam (2%), prepared as described above, (40 ml.) is melted and the temperature adjusted to 150° C.

n-Nonane (1.39 ml.) is injected into the sparged caprolactam with a syringe, the 2% sodium caprolactam is added, the mixture blanketed with nitrogen and stirred for 190 seconds with a stirring rod at which time foaming ensued. After a total of 15 minutes the foam is removed from the test tube mold. The foam has medium fine, moderately uniform cell structure and a density of 0.42 g./ml.

I claim:

1. In a process for the polymerization of substantially anhydrous lactams having from 3 to 12 carbon atoms in the ring which comprises heating said lactam to a temperature below the melting point of the resulting polyamide in the presence of a lactam-base salt made from about 0.1 to about 10 mole percent base, based on lactam, and a cocatalyst, the improvement which comprises using as a cocatalyst from about 0.05 to 5 mole percent, based on lactam, of 2,2,4,4-tetramethyl-1,3-cyclobutanedione.

2. In a process for the polymerization of substantially anhydrous caprolactam which comprises heating said lactam to a temperature below the melting point of the resulting polyamide in the presence of a lactam-base salt made from about 0.1 to about 10 mole percent base, based on lactam, and a cocatalyst, the improvement which comprises using as a cocatalyst from about 0.05 to 5 mole percent, based on lactam, of 2,2,4,4-tetramethyl-1,3-cyclobutanedione.

3. The process of claim 2 wherein a lactam-base salt is formed by heating caprolactam with a base selected from the group consisting of alkali metals, alkaline earth metals and basic derivatives thereof.

4. The process of claim 2 wherein a lactam-base salt is formed by heating caprolactam and sodium hydride.

5. The process of claim 2 wherein a lactam-base salt is formed by heating caprolactam and sodium methoxide.

References Cited by the Examiner

UNITED STATES PATENTS 3,017,391  1/62  Mottus et al. _____ 260—78
3,060,135  10/62  Becke et al. _____ 260—78

WILLIAM H. SHORT, *Primary Examiner.*